United States Patent [19]
Ansari et al.

[11] Patent Number: 5,253,059
[45] Date of Patent: Oct. 12, 1993

[54] METHOD AND CIRCUIT FOR ADJUSTING THE SIZE OF A VIDEO FRAME

[75] Inventors: Rashid Ansari, Hillsborough, N.J.; Christine M. Guillemot, Cesson-Sevigné, France

[73] Assignees: Bell Communications Research, Inc., Livingston, N.J.; France Telecom and Telediffusion de France, Montrouge, France

[21] Appl. No.: 884,730

[22] Filed: May 15, 1992

[51] Int. Cl.[5] .............................................. H04N 7/13
[52] U.S. Cl. .................................... 358/138; 358/133
[58] Field of Search ............... 358/136, 133, 160, 140, 358/135, 22, 138, 141

[56] References Cited

U.S. PATENT DOCUMENTS

| | | | |
|---|---|---|---|
| 2,996,581 | 8/1961 | Lord et al. | 358/138 |
| 3,299,204 | 1/1967 | Cherry et al. | 358/138 |
| 3,324,237 | 6/1967 | Cherry et al. | 358/138 |
| 4,282,546 | 8/1981 | Reitmeier | 358/22 |
| 4,496,974 | 1/1985 | Heitmann | 358/140 |
| 4,682,227 | 7/1987 | Heerah | 358/160 |
| 4,691,233 | 9/1987 | Acampora | 358/136 |
| 4,706,260 | 11/1987 | Fedele et al. | 358/133 |

OTHER PUBLICATIONS

Huang et al. "Design Considerations in PCM Transmission Low-Resolution Monochrome Still Pictures" IEEE vol. 55 No. 3 Mar. 1967.
Pratt, William K. "Image Transmission Techniques" Academic Press Inc. pp. 129-135 1979.
W. Chen et al., "Scene Adaptive Coder," *IEEE Transactions on Communications*, Mar. 1984, vol. COM-32, pp. 225-232.
R. E. Crochiere et al., "Multirate Digital Signal Processing," 1983, Prentice Hall, Englewood Cliffs, New Jersey, pp. 29-42.

*Primary Examiner*—James J. Groody
*Assistant Examiner*—David E. Harvey
*Attorney, Agent, or Firm*—Leonard Charles Suchyta; James W. Falk

[57] ABSTRACT

In accordance with the present invention, the number of bits used to code a frame of video is controlled by controlling the frame size. In a preprocessing stage (40) of a video coding circuit (10), each frame of video is processed by a low pass anti-aliasing filter (43,44) in the horizontal and vertical directions. The cutoff frequencies in the horizontal and vertical directions are determined by a desired frame reduction factor in the corresponding direction. Then to reduce the sampling rate in each dimension, each frame of video is processed horizontally and vertically by a shift varying filter (45,46). When the sampling rate in both the horizontal and vertical directions is reduced by M/N, the number of code bits decreases linearly with M/N.

11 Claims, 6 Drawing Sheets

| Time | Buffer 200 | | | | Output |
|---|---|---|---|---|---|
| $-2T$ | $i_1$ | | | | |
| $-T$ | $i_1$ | $i_0$ | | | |
| $0$ | $i_2$ | $i_1$ | $i_0$ | | $O_0 = i_0$ WITH A FRACTIONAL DELAY OF ZERO |
| $T$ | $i_3$ | $i_2$ | $i_1$ | $i_0$ | $O_1$ = WEIGHTED SUM WITH FRACTIONAL DELAY OF 0.6 |
| $2T$ | $i_4$ | $i_3$ | $i_2$ | $i_1$ | |
| $3T$ | $i_5$ | $i_4$ | $i_3$ | $i_2$ | $O_2$ = WEIGHTED SUM WITH FRACTIONAL DELAY OF 0.2 |
| $4T$ | $i_6$ | $i_5$ | $i_4$ | $i_3$ | $O_3$ = WEIGHTED SUM WITH FRACTIONAL DELAY OF 0.8 |
| $5T$ | $i_7$ | $i_6$ | $i_5$ | $i_4$ | |
| $6T$ | $i_8$ | $i_7$ | $i_6$ | $i_5$ | $O_4$ = WEIGHTED SUM WITH FRACTIONAL DELAY OF 0.4 |
| $7T$ | $i_9$ | $i_8$ | $i_7$ | $i_6$ | |
| $8T$ | $i_{10}$ | $i_9$ | $i_8$ | $i_7$ | $O_5 = i_8$ WITH A ZERO FRACTIONAL DELAY |

METHOD AND CIRCUIT FOR ADJUSTING THE SIZE OF A VIDEO FRAME

FIELD OF THE INVENTION

The present invention relates to a method and circuit for coding video signals. More specifically, the present invention relates to a technique for adjusting the size of a frame of video to be coded to control the amount of bits generated by a video coding circuit.

BACKGROUND OF THE INVENTION

Video services can be provided to subscribers by compressing a video signal using a coding circuit at a transmitting station. The compressed video signal is then transmitted via a telecommunication network such as a packet network to a remotely located subscriber station. At the subscriber station, the video signal is decompressed through use of a decoding circuit to reconstruct the original signal. It is expected that High Definition Television (HDTV) signals will be transmitted to subscribers in this manner.

Typically, a video coding circuit includes a processor for performing an orthogonal transform such as a discrete cosine transfer (DCT) and a quantizer for quantizing the transform coefficients resulting from the orthogonal transform. The coding circuit can code a frame of video using an intra-frame or an inter-frame compression technique. A frame of video to be coded is divided into blocks of pixels which may be $8 \times 8$ or $16 \times 16$ blocks. If the frame is coded using an intra-frame compression technique, the orthogonal transform is applied directly to each block of pixels and the resulting transform coefficients are quantized. If the frame of video is coded using an inter-frame technique, on a block-by-block basis, a decision is made to directly transform and quantize the actual block or to transform and quantize a predictive error which is the difference between the actual block and a prediction. Illustratively, the prediction is a motion-compensated prediction based on a previous frame. Some video coding circuits utilize only the intra-frame mode while other video coding circuits code some frames with an intra-frame mode and some frames with an inter-frame mode. In both the intra-frame and inter-frame mode, the quantized transform coefficients are converted by a coder into variable length (VLC) or fixed length (FLC) code words for transmission to a remote location. In some cases, the coder comprises a run-length coder followed by a variable length coder.

In a variety of applications, it is desirable to control the number of code bits generated by the coding circuit for particular frames. For example, if there is congestion in the network, it may be desirable to reduce the number of code bits generated by the coding circuit to reduce the average bandwidth required to transmit the video signal through the network.

In another example, it may be desirable to control the rate at which the coding circuit generates code bits so as to insure that code bits are transmitted from the coding circuit into the network at a smooth rate. It should be noted that for a particular frame, an intra-frame coding mode results in more code bits than an inter-frame coding mode. Furthermore, busy frames and frame portions result in the generation of more code bits than smooth frames and frame portions. Thus, in general, a video coding circuit generates code bits at a variable bit rate.

Some networks can handle the local fluctuations in bit rate produced by the coding circuit and the code bits are transmitted at a variable bit rate directly into the network. For other networks, it is necessary to smooth out the fluctuations in bit rate generated by the coding circuit before the code bits are transmitted into the network. The rate smoothing can be accomplished by use of a rate buffer which interfaces between the coding circuit and the network. Code bits are written into the rate buffer at a variable rate by the coding circuit and transmitted from the rate buffer into the network at a desired constant or approximately constant rate. To carry out this scheme, it is necessary to maintain the fraction of the rate buffer which is occupied within predetermined upper and lower limits. Thus, in a typical scheme, the contents of the rate buffer are fed back to the coding circuit to control the amount of code bits generated by the coding circuit.

The prior art discloses a number of techniques for controlling the rate at which code bits are generated by the coding circuit.

To adjust the rate at which code bits are produced by a coding circuit, the coarseness of the quantizer may be adjusted (see e.g. W. Chen and W. K. Pratt, "Scene Adaptive Coder", IEEE Trans. Commun., Vol. COM-32, pp. 225-232, March 1984 and C. T. Chen et al, U.S. patent application Ser. No. 381,860 filed Jul. 19, 1989 and assigned to the assignee hereof). A coarse quantizer (i.e. a quantizer with a large step size) results in fewer code bits than a fine quantizer (i.e. a quantizer with a small step size). A problem with this approach for controlling the rate at which code bits are generated by a video coding circuit is that unacceptable artifacts may be produced when the quantizer is made very coarse to fit the signal within a specified bandwidth.

If the allowed budget of bits is too tight, another option is to decimate the signal spatially and/or temporally before coding. Typically, the source signal is decimated horizontally and vertically by a factor of two to obtain a quarter-size frame. However, use of a quarter-size frame can result in a coded image which is of poor quality. The drastic reduction in samples which occurs when there is a conversion to a quarter-size frame makes it difficult to achieve a desired amount of code bits while also maintaining a desired level of quality in the coded video signal. The coding algorithm cannot make up for the reduced number of samples in a quarter-size frame through quantization with a fine quantizer having a very small step size. There is a range of rates for which using a fine quantizer does not make up for the loss of quality resulting from use of a quarter-size frame in forming a coded image.

To overcome this problem, the present invention uses a coding circuit and coding method which achieve a more gradual reduction in frame size than the reduction to quarter-size frames utilized in the prior art. Preferably, the present invention utilizes spatial reduction of M/N in each of the horizontal and vertical dimensions for a total frame size reduction of $M^2/N^2$, where M and N are integers and where $0 < M/N < 1$.

The normal procedure for a conversion by a factor M/N consists of first using interpolation (sampling rate increase) by a factor of M followed by decimation (sampling rate decrease) by a factor of N (see e.g., R. E. Crochiere et al., "Multirate Digital Signal Processing", Prentice Hall, Englewood Cliffs, N.J., 1983) In practice, these interpolation and decimation operations are carried out using periodically shift-varying filters that are derived from interpolation and decimation filters using a polyphase representation. However, such filters are quite complex and are difficult to implement, especially when the flexibility to select among different M/N ratios is desired. One reason for the difficulty in achieving flexibility is that the polyphase periodically shift-varying filters combine both low pass anti-aliasing filtering and interpolation and decimation.

In view of the foregoing, it is an object of the present invention to provide a method and circuit for coding a video image wherein the number of code bits produced can be varied while still maintaining a desired level of coded image quality. More specifically, it is an object of the present invention to provide a video coding circuit and method in which a preprocessing filter stage flexibly achieves a selected frame size reduction in both the horizontal and vertical directions to control the number of code bits generated by a video coding circuit. It is a further object of the present invention to provide a video coding circuit and method which controls the number of code bits by controlling the frame size in combination with controlling the quantizer step size.

SUMMARY OF THE INVENTION

In accordance with an illustrative embodiment of the present invention, a video coding circuit includes a preprocessing stage and a coding stage.

The invention may utilize any type of coding stage. In an illustrative embodiment, the coding stage includes a processor for performing a discrete cosine transform and a quantizer for quantizing the discrete cosine transform coefficients. The coding stage may utilize an intraframe or an inter-frame compression technique.

The preprocessing stage achieves a desired reduction in frame size to control the number of bits generated by the coding stage.

The input to the preprocessing stage is a sequence of full-size video frames. The output of the preprocessing stage is a sequence of video frames of reduced size. This sequence of video frames of reduced size is input into the coding stage which outputs a coded video signal for transmission to a remotely located decoder. In the preprocessing stage, the frames of video are processed by both low pass anti-aliasing filters and shift varying sample reduction filters.

More specifically, in the preprocessing stage, the video frames are filtered in the horizontal direction by a low pass anti-aliasing filter with a normalized cutoff frequency which is equal to or less than $M_H\pi/N_H$. The video frames are also filtered in the vertical direction by a low pass anti-aliasing filter with a normalized cutoff frequency which is equal to or less than $M_v\pi/N_v$. The desired reduction factor in the horizontal direction is $M_H/N_H$ and the desired reduction factor is in the vertical direction is $M_v/N_v$, wherein $M_H, N_H, M_v,$ and $N_v$ are non-negative integers. In a preferred embodiment, the desired reduction factor is the same in the horizontal and vertical directions and is represented by M/N. .

Illustratively, the low pass filters for the horizontal and vertical directions are implemented by finite impulse response (FIR) linear transverse filters. A lookup table is associated with each of the filters to provide the filter coefficients for a selected value of M/N or for selected values of $M_N/N_N$ and $M_v/N_v$.

It should be noted that the vertical and horizontal low pass filters do not change the number of pixel values (i.e. samples) in a frame. These filters only eliminate frequency components which are above the cutoff in both dimensions to suppress the aliasing that normally occurs due to reducing the number of samples in a frame.

To reduce the number of samples in a frame to achieve a reduction in frame size, a shift varying filter is then applied horizontally and vertically. A first particular shift varying filter out of a plurality of available shift varying filters is selected to reduce the horizontal sample rate by a selected value of $M_H/N_H$. A second particular shift varying filter is selected to reduce the vertical sampling rate by a selected value $M_v/N_v$.

The resulting reduced size frames are then coded by the coding stage and transmitted to a remotely located subscriber station. At the subscriber station, the arriving coded signal is decoded to reconstruct the reduced-size frames. The reduced-size frames are interpolated at the subscriber station to restore the original sampling rate if this is required by a display at the subscriber station.

In a preferred embodiment of the invention, the preprocessing stage includes a plurality of low pass filters and a plurality of shift varying filters for the horizontal and vertical directions corresponding to different values of M/N or $M_H/N_H$ and $M_v/N_v$. A feedback signal from the network or from a rate buffer which interfaces the coding stage to the network is applied to the preprocessing stage to select the desired frame size reduction factor to control the number of code bits generated by the coding stage.

The inventive preprocessing stage may be used in combination with a technique for controlling the step size of the quantizer used in the coding stage to further control the number of bits generated by the coding stage.

DETAILED DESCRIPTION OF THE INVENTION

Figure 1:
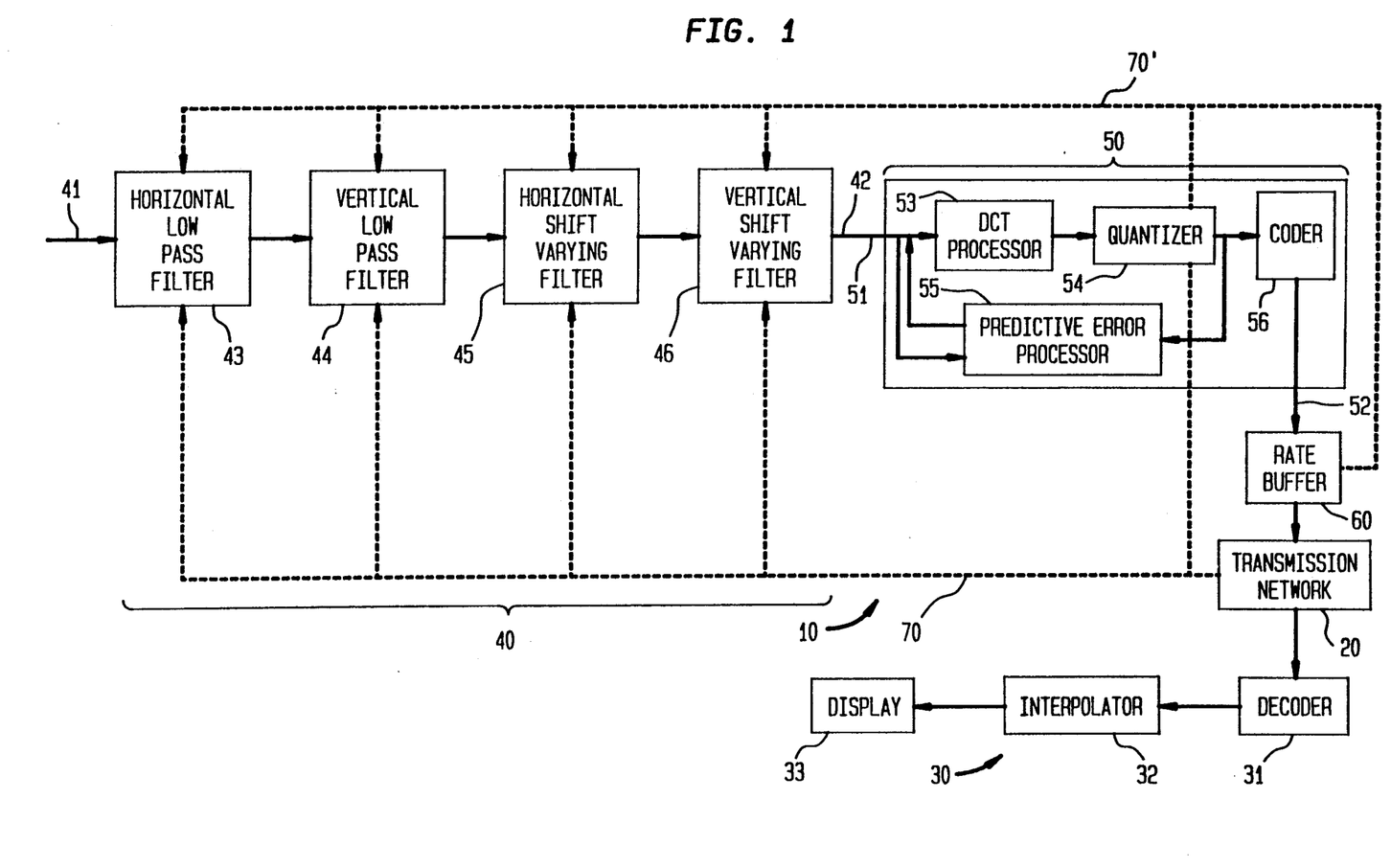
FIG. 1 schematically illustrates a video coding circuit in accordance with an illustrative embodiment of the present invention.
Figure 2A:
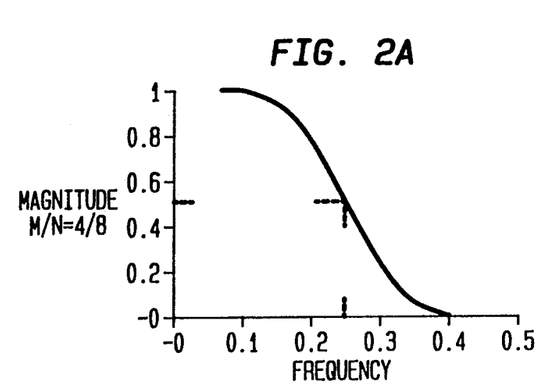
FIGS. 2A, 2B, 2C, and 2D illustrate the transmission characteristics of low pass filters utilized in the coding circuit of FIG. 1.
Figure 2B:
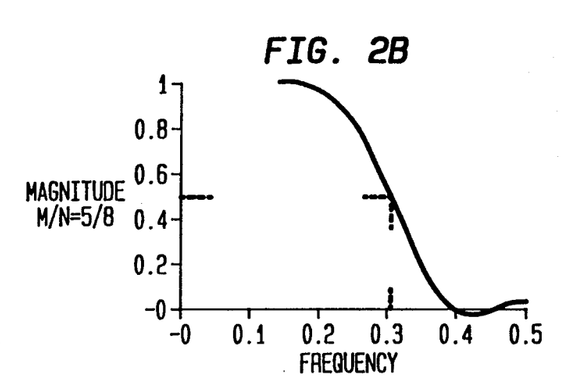
Figure 2C:
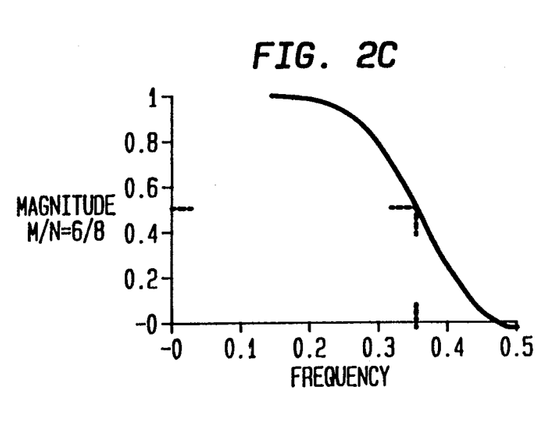
Figure 2D:
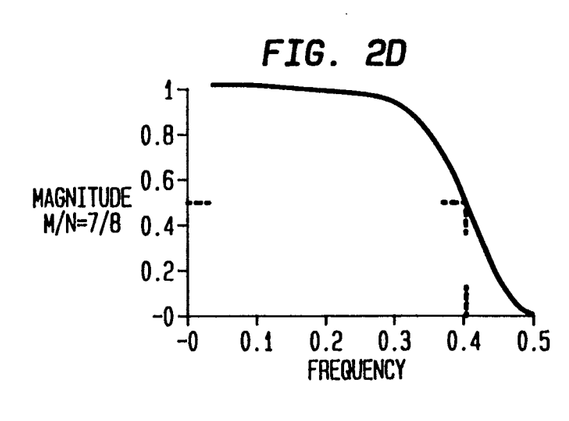

FIG. 1 schematically illustrates a video coding circuit 10, a transmission network 20 and a remotely located subscriber station 30.

The coding circuit 10 includes a preprocessing stage 40 and a coding stage 50. The purpose of the preprocessing stage 40 is to receive frames of video to be coded at the input 41 and to reduce the size of the frames by a particular reduction factor. The reduced-size frames are outputted at the output 42 of the preprocessing stage 40 and are transmitted to the coding stage 50 at the input 51. The coding stage 50 converts each frame into a series of code bits at the output 52. The number of code bits generated by the coding stage 50 for each frame depends on the reduction factor used by the preprocessing stage 40 to reduce the frame size. Thus by controlling the reduction factor utilized by the preprocessing stage 40, it is possible to control the number of code bits generated for a frame by the coding stage 50.

The coding stage 50 is now considered. The present invention is applicable for any video coding scheme. For purposes of illustration, one particular coding scheme is briefly described herein.

Illustratively, the coding stage 50 comprises a DCT processor 53, a quantizer 54, a predictive error processor 55 and a coder 56. Typically, a coding stage such as the coding stage 50 can code in an intra-frame and in an interframe (e.g., a predictive) mode. To code a frame in an intra-frame mode, the frame is divided into blocks of pixels such as 8×8 or 16×16 blocks. The DCT processor 53 applies a DCT transform to each block of pixels and the resulting transform coefficients are quantized by the quantizer 54. The resulting coefficients are then coded by the coder 56. The coder 56 is, for example, a variable length coder or a run length coder in combination with a variable length coder. In addition, the output of the quantizer 54 is fed to the predictive error processor 56. In some coding units, the predictive error processor includes an inverse quantizer and an inverse DCT processor for reconstructing each block of pixels. The reconstructed blocks of pixels are stored for use in coding earlier or later frames in an inter-frame mode. In the case of a frame coded using an inter-frame mode such as a predictive mode, each block of pixels is transmitted to the predictive error processor 55. The predictive error processor 55 outputs a predictive error. Illustratively, the predictive error is the difference between the input block of pixels and a motion compensated prediction from a previous frame which is stored in the predictive error processor 55. Based on a decision criterion involving an activity index, the block of pixels is directly coded by the DCT processor 53 and quantizer 54 or the predictive error is coded by the DCT processor 53 and quantizer 54. In either case, the resulting quantized transform coefficients are processed by the coder 56 to generate code bits. The coder 56 may be a variable length or a fixed length coder. Illustratively, in a group of frames, the first frame is typically intra-frame coded and the remainder of the frames are inter-frame coded.

Depending on the type of coding stage utilized, code bits are generated at a constant or a variable rate. For the coding stage 50 illustrated in FIG 1 and discussed above, the bit rate at the output 52 is variable, depending for example on whether intra-frame or predictive coding is used for a given frame, as predictive coding results in fewer code bits than intra-frame coding. In addition, the number of bits generated varies with image content, with busy portions of frames resulting in more code bits than still portions of frames. In some cases, it is desirable to smooth out these local fluctuations in bit rate before the code bits are transmitted into the transmission network 20. To accomplish this, the optional rate buffer 60 is utilized. In other cases, the code bits generated by the coding stage 50 are transmitted directly into the network 20 at a variable rate.

The case wherein the coding stage 50 is directly connected to the transmission network 20 is considered first. In some situations, such as when there is network congestion, it may be desirable to reduce the average rate at which code bits are produced by the coding stage 50. In this case, the network 20 transmits via the feedback path 70 a signal to the preprocessing stage 40. The feedback signal is utilized by the preprocessing stage 40 to determine a frame reduction factor which in turn determines the size of the frames at the preprocessing stage output 42. For example, if it is desired to reduce the number of code bits produced by the coding stage 50 because of congestion in the network 20, the feedback path 70 transmits a signal which causes the frame size to be reduced. The size of reduction may be established once per group of frames.

In an alternative embodiment of the invention, it is desired to smooth out any variations in output bit rate of the coding stage 50. In this case, the rate buffer 60 is utilized. The rate buffer 60 receives code bits at a variable rate from the coding stage 50 and transmits code bits into the network 20 at a constant rate. In order for the rate buffer to work properly, the fraction of the rate buffer which is occupied has to be maintained between certain upper and lower limits. To maintain the occupancy of the buffer within these limits, a signal indicative of the occupancy fraction of the buffer is fed back via the feedback path 70' to the preprocessing stage 40 to control the frame size, and therefore, the number of bits generated by the coding stage 50. If the occupancy of the rate buffer 60 is too low, the frame size is increased to increase the number of code bits produced by the coding stage 50. If the occupancy of the buffer 60 is too high, the frame size is decreased to decrease the number of code bits produced by the coding stage 50.

Whether or not the rate buffer 60 is utilized, the code bits generated by the coding stage 50 are transmitted to the remotely located subscriber station 30. The subscriber station 30 comprises a decoder 31, which reconstructs the reduced-size frames by reversing the operations of the coding stage 50, and an interpolator 32 which increases the size of the reduced-size frames back to full-size (i.e., reversing the frame size reducing operation of the preprocessing stage 40) if this is required by the display 33.

The preprocessing stage 40 is now considered in detail. The stage 40 comprises a horizontal low pass filter 43, a vertical low pass filter 44, a horizontal shift varying filter 45 and a vertical shift varying filter 46.

Full-size video frames are received at the input 41 of the stage 40. The frames are processed in the horizontal and vertical directions by the low pass filters 43 and 44 and then the number of samples in the horizontal and vertical directions is reduced by the shift varying filters 45 and 46 to generate reduced-sized frames at the output 42.

The cutoff frequency of the horizontal low pass filter 43 is $M_H\pi/N_H$ and the cutoff frequency of the vertical low pass filter is $M_v\pi/N_v$. The quantities $M_H\pi/N_H$ and $M_v\pi/N_v$ represent frequencies in radians which are normalized to the Nyquist frequency. (Thus, in an unfiltered signal the range of frequencies in radians is from 0 to $\pi$). As indicated above, $M_H/N_H$ is the desired reduction factor in the horizontal direction and $M_v/N_v$ is the desired reduction factor in the vertical direction. The horizontal and vertical reduction factors may be selected in response to the feedback signals transmitted via the path 70 from the network 20 or via the path 70' from the rate buffer 60, if such a rate buffer is utilized.

In an illustrative embodiment of the invention, $N_H$ and $N_v$ are set to 8 and $M_H$ and $M_v$ may be selected from 4, 5, 6 and 7.

The low pass filters 45 and 46 may be implemented using finite impulse response filters with monotone passband frequency responses. A lookup table is provided so that different filter coefficients can be selected corresponding to different values of $M_H/N_H$ and $M_v/N_v$. FIGS. 2A, 2B, 2C and 2D illustrate the transmission characteristics for N(i.e., NM or $N_v$)=8 and M (i.e., $M_H$ or $M_v$)=4, 5, 6, and 7. The quality of the reconstructed signal at the subscriber station 30 (see FIG. 1) depends on the responses of the filters utilized. In FIGS. 2A, 2B, 2C, 2D, the filters are of duration eleven (see FIG. 3) and the frequency responses are such that they result in some but not excessive aliasing.

Figure 3:
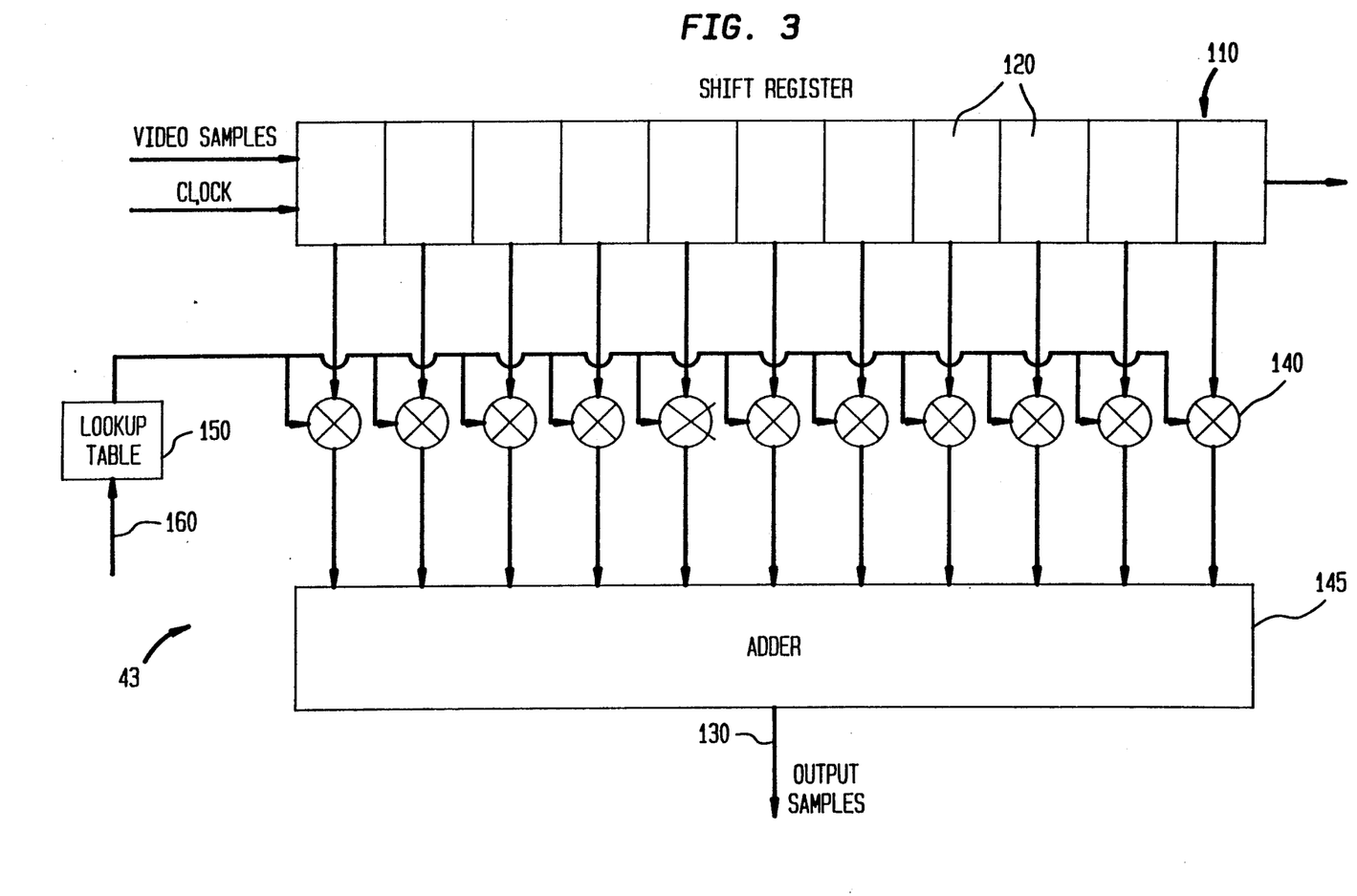
FIG. 3 schematically illustrates a low pass filter for use in the coding circuit of FIG. 1.

The operation of an FIR filter 43 or 44 is illustrated in FIG. 3. Each of the filters 43 and 44 comprises a shift register 110 for storing video samples. The shift register 110 illustratively comprises eleven individual storage elements 120. At each clock cycle, all the video samples are shifted one location to the right, the rightmost sample is eliminated, and a new sample is stored in the leftmost storage element. For each clock cycle, an output sample appears at the output 130. Each output sample is a weighted sum of the input samples stored in the storage elements 120. To obtain the weighted sum, each of the samples stored in the storage elements 120 is multiplied by a weighting coefficient using a multiplier 140. The outputs of the multipliers 140 are added by the adder 145 to obtain an output sample at the output 130. Depending on whether M=4,5,6, or 7, different weighting coefficients are utilized. The coefficients for the different values of M are stored in the lookup table 150 and are applied to the multipliers 140 in response to an input signal on line 160, which input signal may be the feedback signal on path 70 or 70' of FIG. 1.

After processing by the low pass filters 43 and 44 the frames are processed by the horizontal and vertical shift varying filters 45 and 46. The horizontal shift varying filter 45 reduces the number of samples in the horizontal direction by $M_H/N_H$ and the vertical shift varying filter 46 reduces the number of samples in the vertical direction by $M_v/N_v$.

Figure 4A:
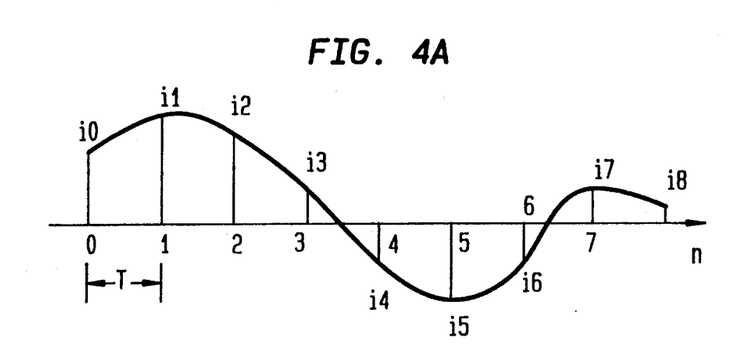
FIGS. 4A, 4B, 4C and 4D schematically illustrate the operation of a shift varying filter for use in the coding circuit of FIG. 1.
Figure 4B:
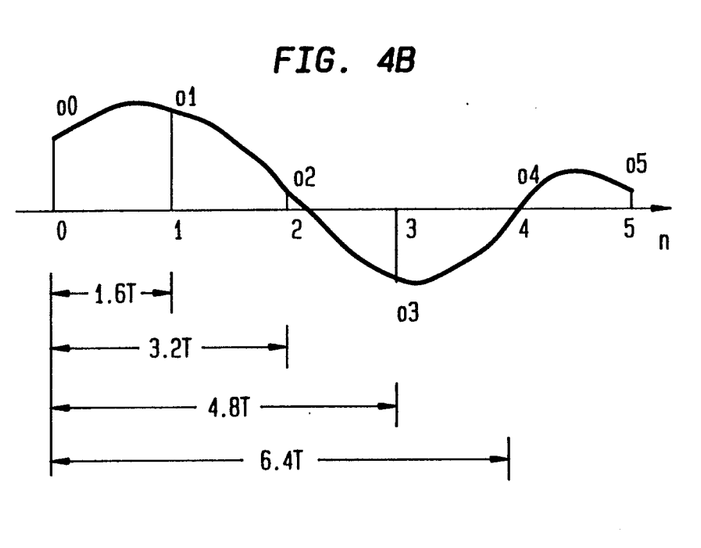

The operation of a shift varying filter is illustrated in FIG. 4A, 4B, 4C and 4D. In particular, FIGS. 4A, 4B, 4C and 4D illustrate the operation of the shift varying filter 45 for the case when M/N=5/8. FIG. 4A shows the temporal locations of nine input samples for the shift varying filter 45. The input samples are labeled $i_0, i_7, \ldots, i_8$. The temporal spacing between the input samples is T. For a 30 frame/sec video signal wherein each frame is 720×480 pixels, the sample spacing is about $9.6 \times 10^{-8}$ seconds. FIG. 4B shows the locations of the output samples $0_0, 0_1, \ldots, 0_5$. Relative to the input samples, the temporal spacing of the output samples is 1.6 T.

The output sample $O_0$ is obtained by retaining the input sample $i_0$. The output sample $O_1$, is a weighted sum of the two nearest preceding and two nearest succeeding input samples $i_0, i_1, i_2$ and $i_3$. Similarly, the output sample $O_2$, is a weighted sum of the two nearest preceding and two nearest succeeding input samples $i_2, i_3, i_4$ and $i_5$. The output sample $O_3$ is a weighted sum of $i_4, i_5, i_6$ and $i_7$ and the output sample $O_4$ is a weighted sum of $i_5, i_6, i_7$ and $i_8$. The output sample $O_5$ is obtained by retaining the input sample $i_5$.

Figure 4C:
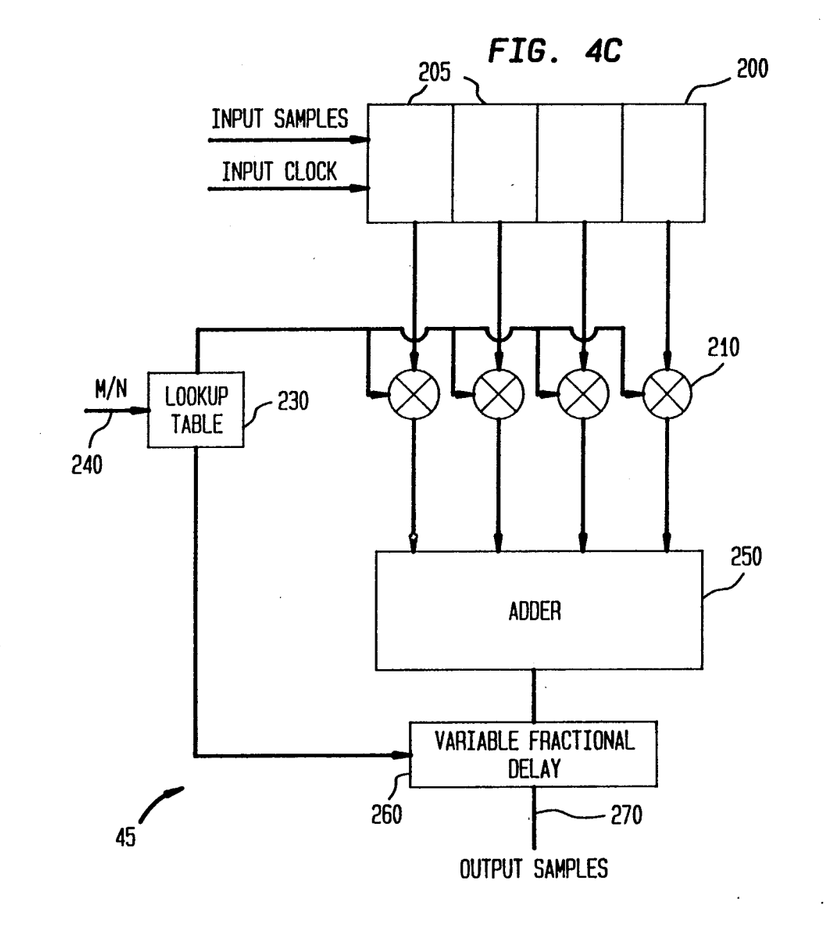
Figure 4D:
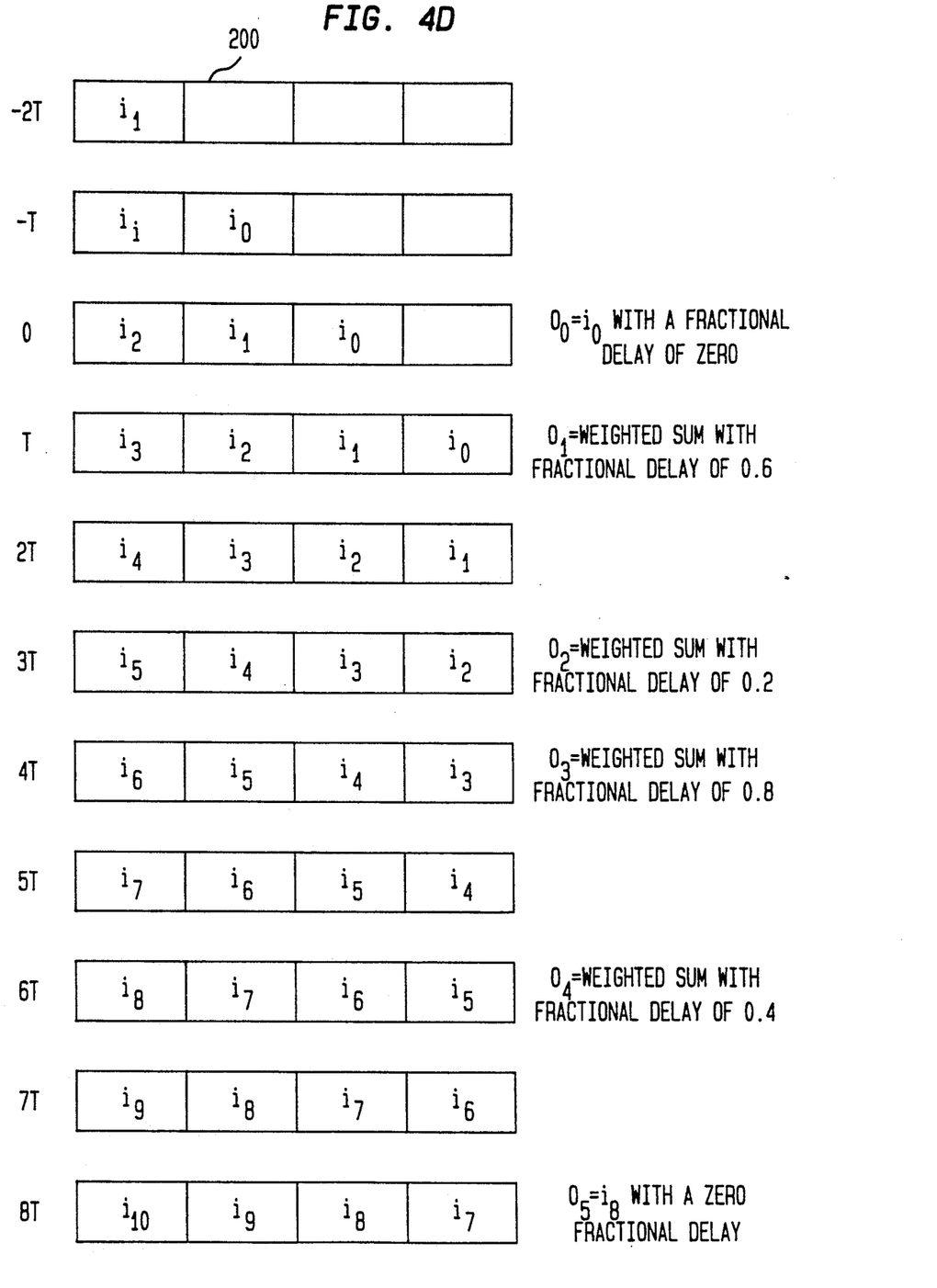

The operation of the shift varying filter 45 is illustrated in greater detail in FIG. 4C. The filter 45 illustratively comprises a shift register 200 for storing the input video samples $i_0, i_1 \ldots$. The shift register 200 comprises four individual storage elements 205. Four storage elements are needed because each output sample is a weighted sum of four input samples. To generate an output sample, a weighted sum of input samples is obtained using the multipliers 210. The weighting coefficients are supplied by a lookup table 230 which provides specific weighting coefficients depending on a selected value of M/N. The value of M/N may be selected by a signal applied to the input 240 of the lookup table 230. The signal applied to the input 240 of the lookup table 230 may be generated via one of the feedback paths 70 or 70' (see FIG. 1). The outputs of the multipliers 210 are added by the adder 250. To obtain the appropriate output sample spacing at the output 270, the variable delay 260 is utilized. Depending on the particular value of M/N, a variable delay device 260 provides a sequence of delays to implement the proper output sample spacing. In the case where M/N is 5/8, fractional delays of 0, 0.6 T, 0.2 T, 0.8 T, and 0.4 T are used. This may be understood as follows:

FIG. 4D shows the contents of the shift register 200 at particular values of the discrete time variable nT. At time n=0, the output $O_0$ is formed by transmitting the input sample $i_1$ directly to the output 270. This is accomplished by setting all the weighting coefficients to zero except the coefficient of $i_1$ which is set to 1 and by setting the variable delay 260 to zero. The output sample $O_1$ is generated by obtaining a weighted sum of the content of the register at time n=1 and adding a fractional delay of 0.6 so that $O_0$ and $O_1$ are spaced apart by 1.6 T. As indicated above, the weighted sum is obtained using multipliers 210 and the delay is provided by the delay 260 of FIG. 4C. The output sample $O_2$ is obtained from a weighted sum of the register contents at time n=3 with a fractional delay of 0.2. The output sample $O_3$ is obtained from a weighted sum of the register contents at time n=4 with a fractional delay 0.8 and the output sample $O_4$ is obtained from a weighted sum of the register contents at time n=6 with a fractional delay of 0.4. The sequence of fractional delays 0, 0.6, 0.1, 0.8, 0.4 then repeats itself starting at time n=8 at which the output sample $O_5$ is set to be equal to $i_8$ with a zero fractional delay.

Thus, by selecting the appropriate weighting coefficients and fractional delays depending on a desired reduction factor M/N, the number of samples is reduced. This is accomplished in the horizontal direction using the shift varying filter 45 and in the vertical direction using the shift varying filter 46. The resulting reduced-size frames are then coded by the coding stage 50 in the manner described above.

In short, the number of bits used to code a frame of video is controlled by controlling the frame size. In a preprocessing stage of a video coding circuit, each frame of video is processed by a low pass anti-aliasing filter in the horizontal and vertical directions. The cut-off frequencies in the horizonal and vertical directions are determined by a selected frame reduction factor in the corresponding direction. Then to reduce the sampling rate in each direction, each frame of video is processed horizontally and vertically by a shift varying filter. When the sampling rate in both the horizontal and vertical direction is reduced by M/N, the number of code bits decreases linearly with M/N.

In addition, the strategy of the present invention for controlling video frame size may be used in combination with a strategy for controlling the quantizer step size to control the number of bits utilized to code a frame of video. In this case, a signal may be sent from the rate buffer 60 via path 70' to the quantizer 54 to control the quantizer step size based on buffer content, for example. Alternatively, a signal may be sent from the network 20 via the path 70 to the quantizer 54 to control the quantizer step size.

Finally, the above described embodiments of the invention are intended to be illustrative only. Numerous alternative embodiments may be devised by those skilled in the art without departing from the spirit and scope of the following claims.

We claim:

1. A bit rate control method for controlling the number of bits generated by a video coding circuit for transmission from the coding circuit in response to a sequence of full size video frames comprising the steps of processing each full size video frame by low pass and shift varying filters in the horizontal and vertical directions, the shift varying filters reducing the number of samples to generate reduced size video frames, coding said reduced size video frames to generate the code bits for transmission from the coding circuit, and responsive to the output from the coding circuit, feeding signals back to the low pass filters to determine the cut-off frequency of the low pass filters and to the shift varying filters to determine the selected horizontal and vertical reduction factors for the reduced size frames.

2. The method of claim 1 wherein in said processing step comprises processing said frames by low pass filters in the horizontal and vertical directions.

3. The method of claim 1 wherein said selected horizontal reduction factor is a rational factor $M_H N_H$ where $M_H$ and $N_H$ are positive integers and $M_H < N_H$ and wherein said selected vertical reduction factor is a rational factor $M_v/N_v$ where $M_v$ and $N_v$ are positive integers and $M_v < N_v$.

4. The method of claim 3 wherein $M_H/N_H = M_v/N_v = M/N$ and wherein the number of samples in each frame is reduced by a factor $M^2/N^2$.

5. The method of claim 1 wherein said method further comprises the step of adjusting a quantizer step size.

6. The method of claim 1 wherein said selected reduction factor is equal in the horizontal and vertical directions.

7. The method of claim 1 wherein said selected reduction factor is unequal in the horizontal and vertical directions.

8. The method of claim 1 wherein said coding comprises both intra-frame and inter-frame coding.

9. A coding circuit for coding reduced size video frames in response to full size video frames comprising a processing stage for receiving said full size video frames and processing said frames of video to control the number of code bits generated for each frame of video, said processing stage comprising low pass filter means for filtering said frames in the horizontal and vertical direction and shift varying filter means for reducing the number of samples in said frames, coding means connected to said processing stage for coding the processed frames from the processing stage, and feedback means responsive to the output of said coding means and connected to said low pass filter means for determining the horizontal and vertical cutoff frequency of said low pass filter means and connected to said shift varying filter means for determining the horizontal and vertical reduction factors of said shift varying filter means, the number of code bits for a frame generated by said coding circuit being dependent on said horizontal and vertical reduction factors.

10. A coding circuit in accordance with claim 9 wherein said feedback means includes a rate buffer circuit connected to the output of said coding means.

11. A coding circuit in accordance with claim 9 wherein said coding means includes a DCT processor, a quantizer, a predictive error processor, and a coder.

* * * * *